United States Patent
Carlson et al.

(10) Patent No.: US 11,697,486 B2
(45) Date of Patent: Jul. 11, 2023

(54) SINGLE BUTT LINE KEEL AND ROOF BEAM

(71) Applicant: Bell Textron Inc., Fort Worth, TX (US)

(72) Inventors: Nicholas Ralph Carlson, Dallas, TX (US); William Anthony Amante, Grapevine, TX (US); Timothy Brian Carr, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 273 days.

(21) Appl. No.: 16/596,922

(22) Filed: Oct. 9, 2019

(65) Prior Publication Data

US 2021/0107618 A1 Apr. 15, 2021

(51) Int. Cl.
*B64C 1/06* (2006.01)

(52) U.S. Cl.
CPC .............. *B64C 1/061* (2013.01); *B64C 1/069* (2013.01)

(58) Field of Classification Search
CPC ......... B64C 1/061; B64C 1/065; B64C 1/069; B64C 1/064; B64C 1/18
See application file for complete search history.

(56) References Cited

U.S. PATENT DOCUMENTS

| | | | | | |
|---|---|---|---|---|---|
| 2,132,529 | A | * | 10/1938 | Firner | B64C 1/065 244/119 |
| 2,288,829 | A | * | 7/1942 | Newman | B64C 1/061 244/38 |
| 3,023,860 | A | * | 3/1962 | Ellzey | B64C 1/061 244/120 |
| 5,377,934 | A | * | 1/1995 | Hill | B64C 27/04 244/17.11 |
| 2012/0034416 | A1 | * | 2/2012 | Lutz | B64C 1/061 428/121 |
| 2015/0353199 | A1 | * | 12/2015 | Campbell | B64C 1/22 414/812 |
| 2020/0156803 | A1 | * | 5/2020 | Kooiman | B64D 37/04 |

* cited by examiner

*Primary Examiner* — Richard Green
*Assistant Examiner* — Colin Zohoori
(74) *Attorney, Agent, or Firm* — Fogarty LLP (57) ABSTRACT

Embodiments are directed to an aircraft fuselage comprises two keel beams and two roof beams. Each keel beam is formed as a single component having no joints. Each keel beam comprises a first portion that is configured to define a floor of an aircraft and a second portion that is configured to define a tail section of an aircraft. The second portion is positioned at an angle relative to the first portion. Each roof beam is coupled to the second portion of a corresponding keel beam at a point remote from the first portion. Each roof beam and a corresponding keel beam are positioned along a single butt line relative to an aircraft fuselage centerline. Frame members are coupled to both keel beams and both roof beams.

12 Claims, 6 Drawing Sheets

SINGLE BUTT LINE KEEL AND ROOF BEAM

TECHNICAL FIELD

The present invention relates generally to aircraft fuselage construction and, more particularly, to an aircraft fuselage having one-piece, continuous keel beams and roof beams that remain in a constant butt line plane.

BACKGROUND

An aircraft fuselage is a critical component that is responsible for securing aircrew, passengers, and cargo. The fuselage may contain the engine as well. The fuselage may be constructed using one of several structures. A truss structure fuselage has a rigid framework made up of members, such as steel tubing, welded together so that all members of the truss carry both tension and compression loads. The truss-framed fuselage is sometimes covered with fabric. A monocoque fuselage is designed so that the strength of the skin to carry the primary load. A semi-monocoque fuselage design is similar to the monocoque fuselage structure but the aircraft skin is reinforced by longitudinal members called longerons or beams.

SUMMARY

Embodiments are directed to an aircraft fuselage having keel and roof beams that are in the same butt line. The web of each keel beam and corresponding roof beam may be on the same butt line. The arrangement of the keel beams and roof beams allows for simple and weight-efficient connection at the aft end of the fuselage. The configuration further simplifies tooling fixtures since the beams may serve as location features for roof, floor, and fuselage subassemblies in a single flat plane, which leads to manufacturing cost savings through tool and time reduction.

In one embodiment, an aircraft fuselage comprises two keel beams and two roof beams. Each keel beam is formed as a single component having no joints. Each keel beam comprises a first portion that is configured to define a floor of an aircraft and a second portion that is configured to define a tail section of an aircraft. The second portion is positioned at an angle relative to the first portion. Each roof beam is coupled to the second portion of a corresponding keel beam at a point remote from the first portion. Each roof beam and a corresponding keel beam are positioned along a single butt line relative to an aircraft fuselage centerline. Frame members are coupled to both keel beams and both roof beams.

Each keel beam and each roof beam comprise a web portion between an upper flange and a lower flange, and wherein the web portion comprises a plurality of reinforced openings and/or stiffening elements. The web portion of each keel beam may be located on an opposite side relative to location of the web portion of a corresponding roof beam. The keel beam and a corresponding roof beam may be formed as a single component from a single, continuous material.

In another embodiment, an aircraft fuselage comprises a keel beam having a first portion and a second portion. The first portion and the second portion are formed from a single, continuous material. The second portion is positioned at an angle to the first portion. The fuselage further comprises a roof beam that coupled to the second portion of the keel beam. The roof beam is coplanar with the first portion and the second portion of the keel beam. One or more frames may be coupled to the roof beam and either the first portion or the second portion of the keel beam.

The first portion and the second portion of the keel beam and the roof beam may be formed from the single, continuous material. The second portion of the keel beam may be fixedly coupled to the roof beam so that the roof beam does not move relative to the keel beam. Alternatively, a slip joint may couple the roof beam to the keel beam. The slip joint may allow for angular, lateral, and/or longitudinal alignment between the roof beam and the keel beam by washing out part tolerances.

The aircraft fuselage may further comprise one or more additional keel beams. Each additional keel beam has a first portion and a second portion formed from a single, continuous material. The first and second portions of each additional keel beam are positioned at an angle to each other. A separate roof beam is coupled to the second portion of each additional keel beam. Each roof beam is coplanar with the first portion and the second portion of an associated keel beam.

In a further embodiment, an aircraft fuselage comprises two pairs of keel beams and roof beams. Each keel beam and roof beam pair is positioned on a single butt line on opposite sides of an aircraft fuselage centerline. Each keel beam comprises a single, continuous material having a first portion and a second portion. The second portion is configured at an angle to the first portion. The roof beam is coupled to the second portion of the keel beam. The roof beam is coplanar with the first portion and the second portion of a corresponding keel beam. The first portion and the second portion of the keel beam and the roof beam may be formed from the single, continuous material.

The second portion of the keel beam may be fixedly coupled to the roof beam so that the roof beam does not move relative to the keel beam. Alternatively, a slip joint may couple the roof beam to the keel beam. The slip joint may allow for angular alignment between the roof beam and the keel beam. The slip joint may allow for lateral and/or longitudinal alignment of the roof beam relative to the keel beam by washing out part tolerances. One or more frames are coupled to the roof beams and either the first portions or the second portions of corresponding keel beams.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
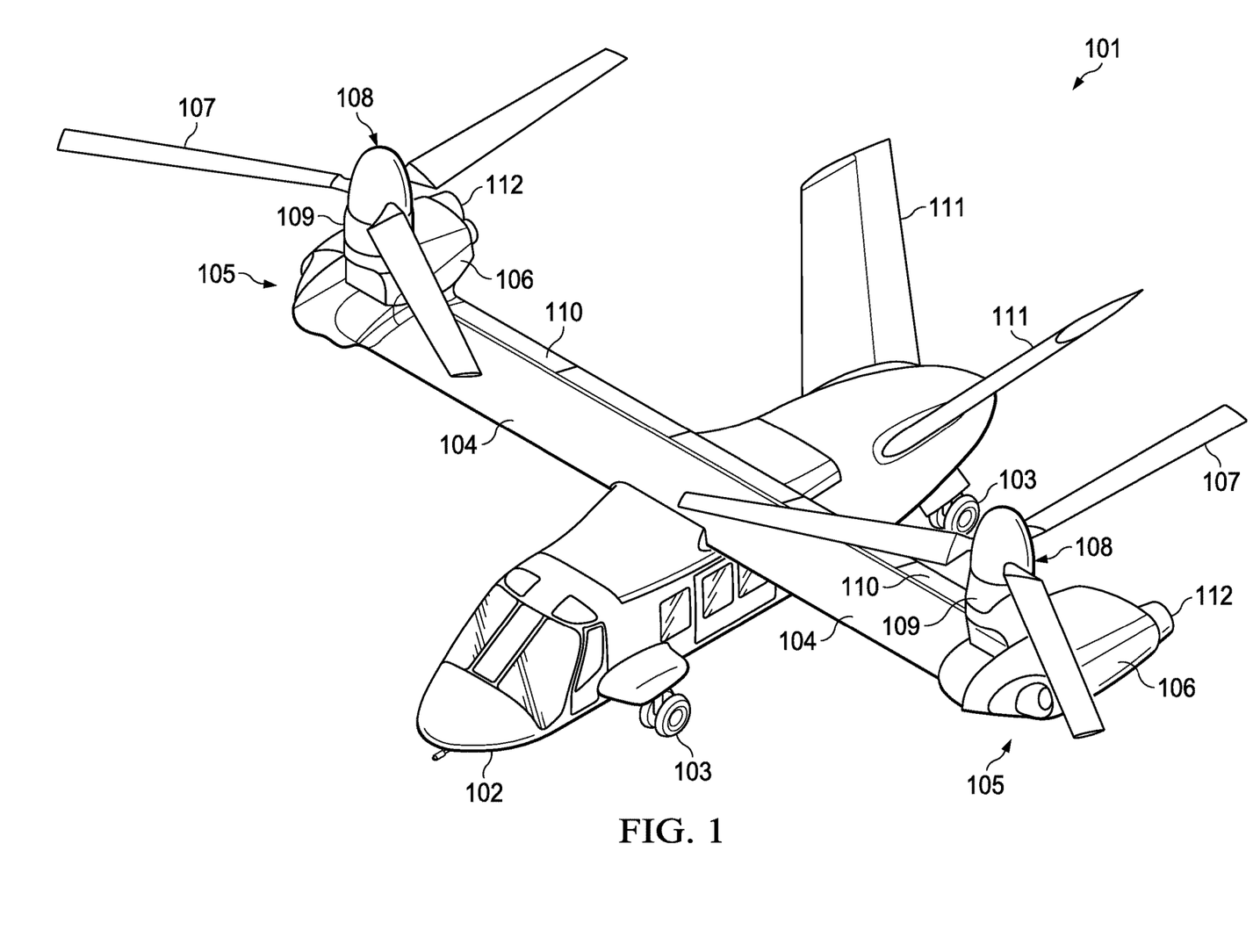
FIG. 1 illustrates a tiltrotor aircraft adapted for use with embodiments of the fuselage construction disclosed herein.

FIG. 1 illustrates a tiltrotor aircraft 101 having a fuselage 102, landing gear 103, and wings 104. A propulsion system 105 is positioned on the ends of wings 104. Each propulsion system 105 includes an engine 106 and a proprotor 108 with a plurality of rotor blades 107. The tiltrotor aircraft 101 includes controls, e.g., cyclic controllers and pedals, carried within a cockpit area of fuselage 102, for directing movement of the aircraft 101 and for selectively controlling the pitch of each blade 107 to control the direction, thrust, and lift of tiltrotor aircraft 101. For example, during flight a pilot can manipulate a cyclic or collective controller to change the pitch angle of rotor blades 107 and/or manipulate pedals to provide vertical, horizontal, and yaw flight movement. In other embodiments, aircraft 101 may be controlled by an onboard autopilot and/or controlled remotely (e.g., a drone aircraft).

Propulsion system 105 includes a nacelle or pylon 109 that is configured to rotate along with other rotatable pylon structure to improve aerodynamic airflow. Moveable pylon 109 can be mechanically coupled to an actuator system used for moving the proprotors 107 between airplane mode in which proprotors 108 are positioned substantially horizontal and helicopter mode in which proprotors 108 are positioned substantially vertical. During flight in airplane mode, vertical lift is primarily supplied by the airfoil profile of wings 104, while rotor blades 107 provide forward thrust. During flight in helicopter mode, vertical lift is primarily supplied by the thrust of rotor blades 107. It should be appreciated that tilt rotor aircraft 101 may also be operated such that propulsion systems 105 are selectively positioned between airplane mode and helicopter mode, which can be referred to as a conversion mode. Control surfaces 110 on wing 104 are used to adjust the attitude of tiltrotor aircraft 101 around the pitch, roll, and yaw axes while in airplane or conversion mode. Additional stabilizers or control surfaces 111 may be required when tiltrotor aircraft 101 is in airplane mode. Control surfaces 110 and 111 may be, for example, ailerons, flaps, slats, spoilers, elevators, rudders, or ruddervators.

Fuselage 102 forms aircraft 101's main body, which is configured to hold crew, passengers, cargo, weapons, mission equipment, and the like. Fuselage 102 is typically a hollow generally tube-shaped structure that is divided into different sections, such as a cockpit, passenger cabin, cargo bay, and equipment and avionics compartments. Pylons 109 may house the engines and transmissions for tilt rotor aircraft 101. Alternatively, the engine and transmission components may be housed in or on fuselage 102. Wings 104, control surfaces 111, and landing gear are attached to fuselage 102, which may also carry control links, electrical cables, hydraulics lines, and other components that are used to control aircraft 101 during flight. Fuselage 102 is designed to withstand any loads aircraft 101 may encounter during flight. The design of fuselage 102 must balance keeping the weight of aircraft 101 as low as possible versus keeping it strong enough to withstand expected loads with a significant safety margin. Fuselage 102 may comprise a frame having a skin attached. The frame may comprise a rigid material, such as aluminum or other metal. The skin provides an aerodynamic surface and, in some cases, also provides an airtight enclosure that supports pressurization of an internal cockpit and passenger cabin.

Figure 2:
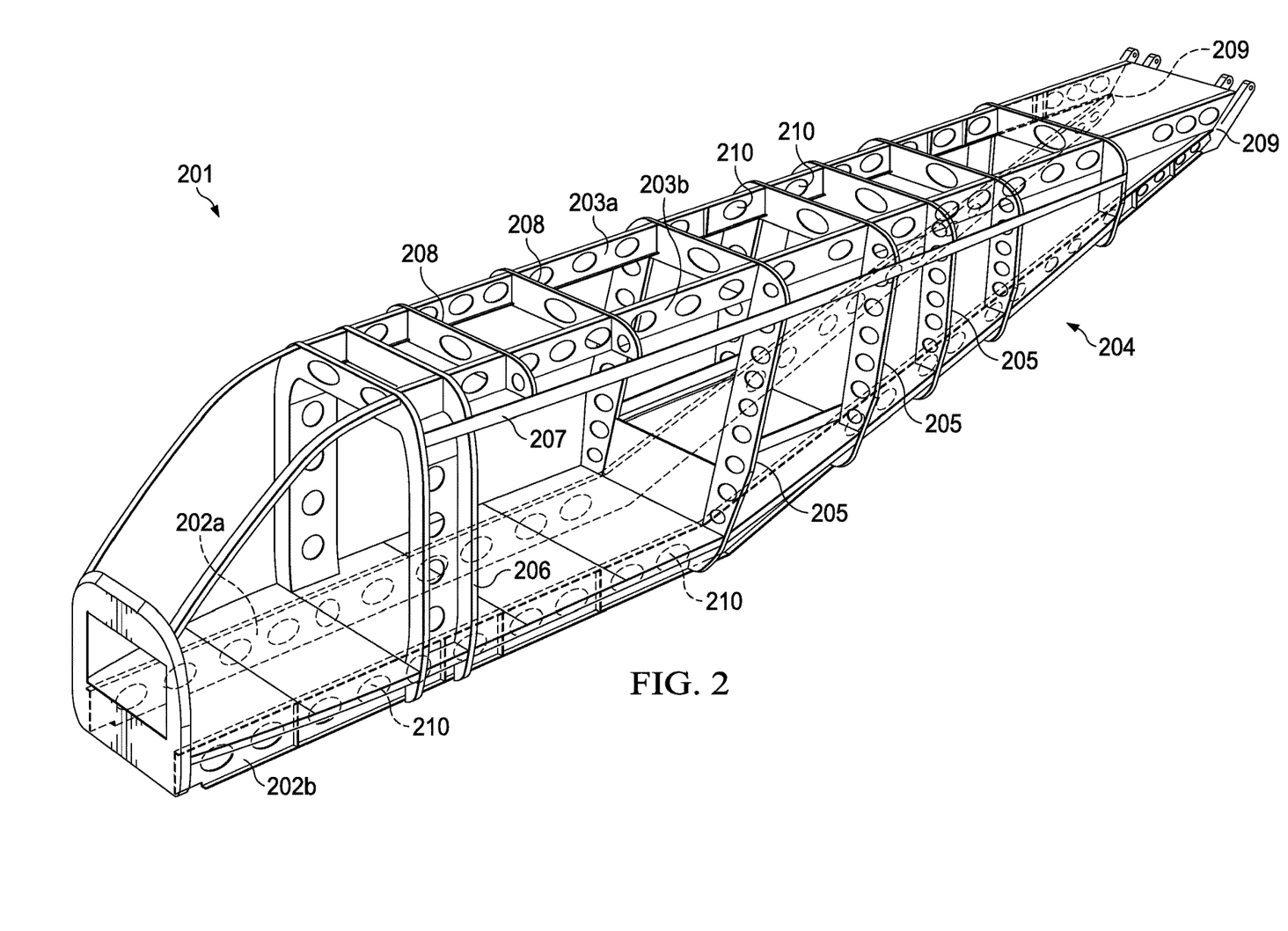
FIG. 2 illustrates an aircraft fuselage assembly according to an example embodiment.

FIG. 2 illustrates an aircraft fuselage assembly 201 according to an example embodiment. Fuselage assembly 201 comprises two keel beams 202a and 202b and two roof beams 203a and 203b. The keel beams 202a and 202b are angled upward at the rear section 204 of fuselage assembly 201. The upward sweep of keel beams 202a and 202b reduces the size of the empennage of the aircraft, which also reduces aircraft weight and allows the aircraft to avoid a tail strike in a flair maneuver on landing.

A number of bulkheads or frame members 205 are attached at intervals to keel beams 202a and 202b and roof beams 203a and 203b. The size of each frame member 205 is selected based upon the overall size and shape of fuselage assembly 201 and the position of the frame member 205. Box frame members 206 may be attached to keel beams 202a and 202b and roof beams 203a and 203b to provide additional structural support for areas subject to high levels of stress and/or lift forces, such as attachment points for wings or engine mounts. Additional structural support is provided by longerons or stringers 207 and intercostals or ribs 208. Components such as frames 205 and 206, stringers 207, and ribs 208 may be attached to keel beams 202a and 202b and roof beams 203a and 203b using mechanical fasteners and/or adhesive bonding as appropriate to support expected aircraft loads during operation.

Each keel beam 202a, 202b is paired with a roof beam 203a, 203b. Each keel beam and roof beam pair 202a/203a and 202b/203b may be formed as a single element such that they are fixedly attached and do not move relative to each other. The embodiments disclosed herein eliminate the need for heavy and complex joints between a keel beams and associated roof beam. In other embodiments, each keel beam and roof beam pair 202a/203a and 202b/203b may be separate components that are attached by a slip joint 209 that absorbs any off-centering or loss of parallel accuracy between a keel beam 202a,b and associated roof beam 203a,b. The slip joint allows for some angular and/or lateral alignment between the components of the keel beam and roof beam pair 202a/203a and 202b/203b.

Figure 3:
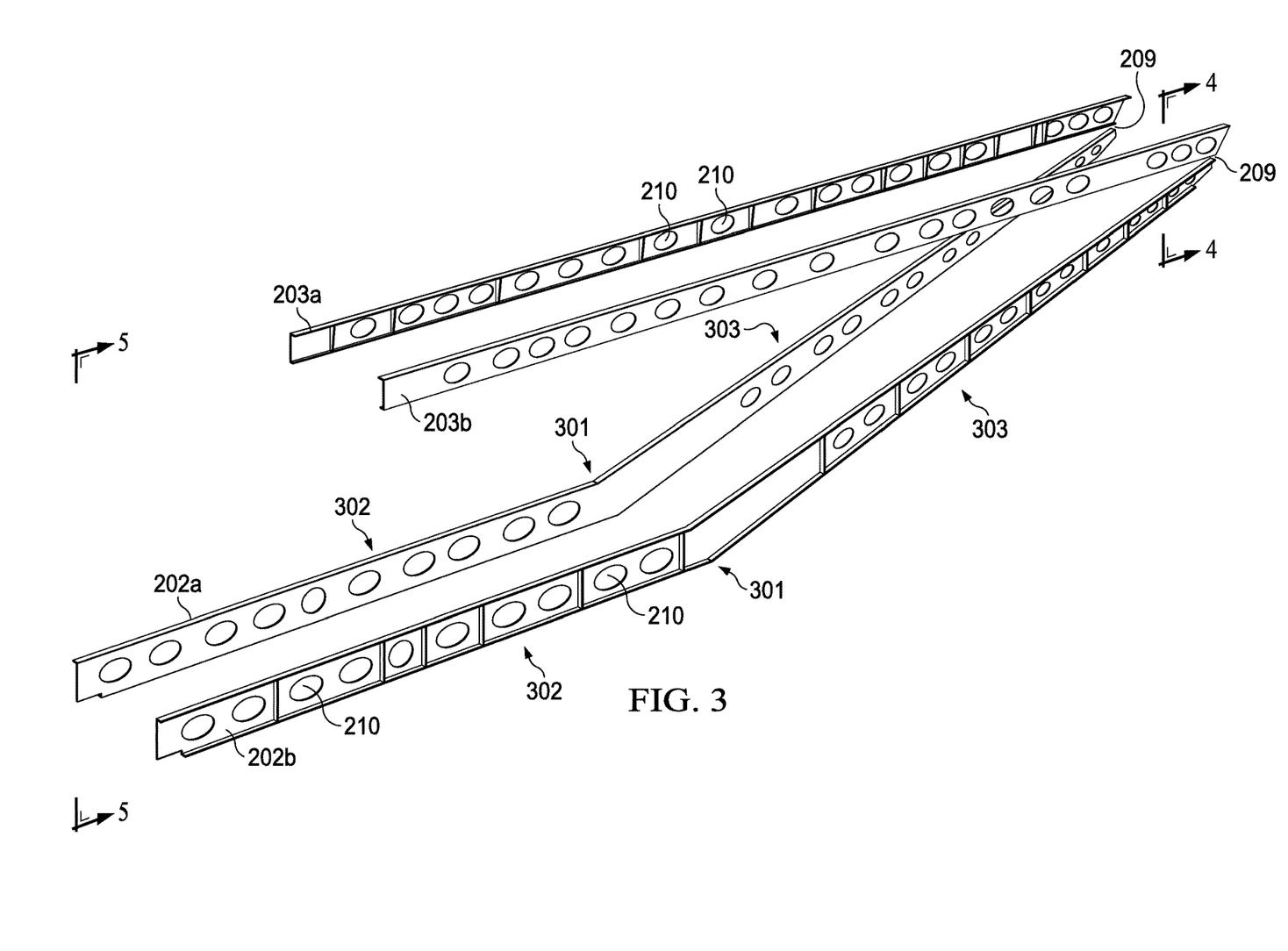
FIG. 3 depicts keel beams and roof beams for an aircraft fuselage assembly.
Figure 4:
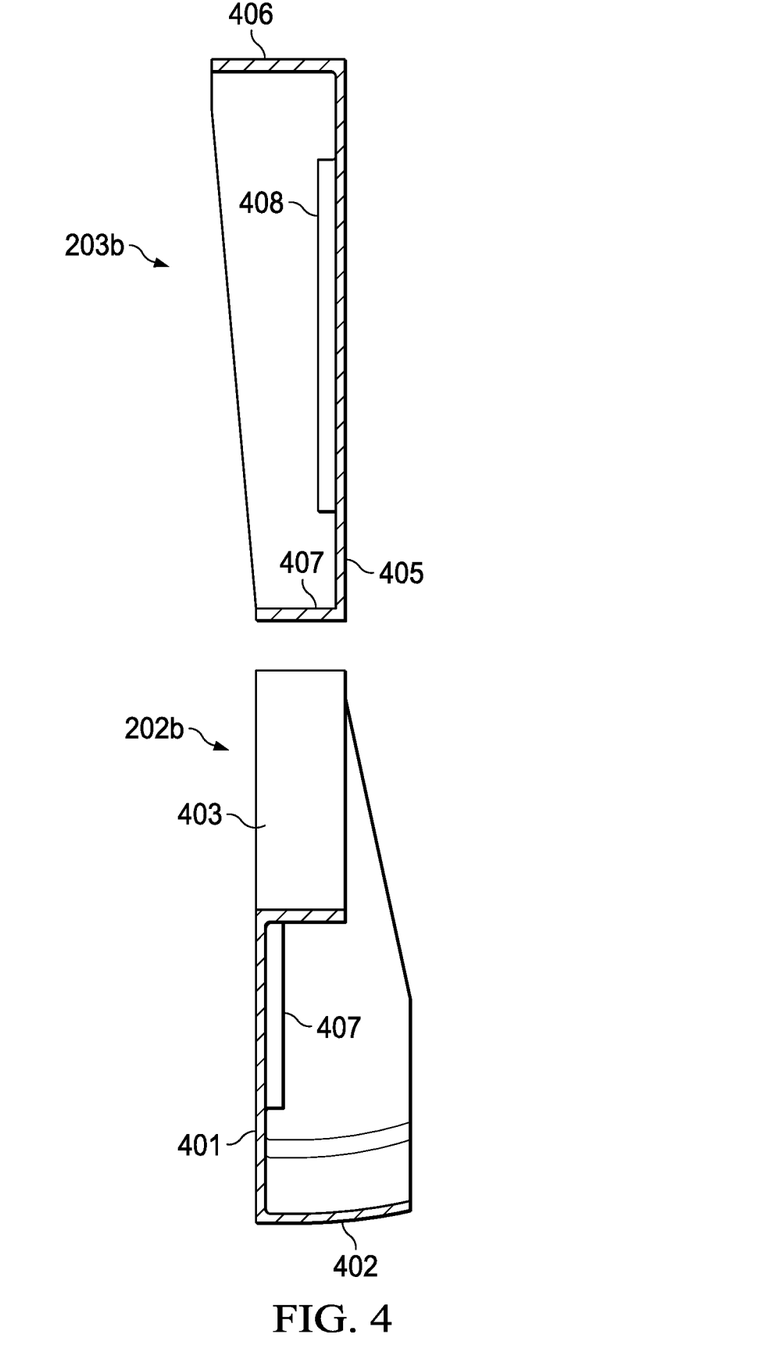
FIG. 4 is a cross-section view of a keel beam and a roof beam according to an example embodiment.

FIG. 3 depicts keel beams 202a and 202b and roof beams 203a and 203b isolated from the aircraft fuselage assembly 201 shown in FIG. 2. FIG. 4 is a cross-section view of keel beam 202b and roof beam 203b. A cross-section view of keel beam 202a and roof beam 203a would be a mirror image of FIG. 4.

In one embodiment, each keel beam 202a, 202b and roof beam 203a, 203b are one-piece, continuous structures that remain in a constant butt line plane, where butt lines designate locations left or right of the centerline of the fuselage assembly 201. Fuselage stations may be used to designate locations along the length of the aircraft fuselage 201, starting from the nose toward the tail. Water lines may be used to designate locations in the height of the aircraft, starting from the ground up. As single, continuous structures in a constant butt line plane, keel beams 202a and 202b and roof beams 203a and 203b allow for the fuselage assembly 201 to maintain a constant width. This allows fuselage assembly 201 to efficiently support attachments, such as wings, engines, spindles, ducts, etc., along the length of the fuselage and to use common attachment points defined on both pairs of keel beams and roof beams, such as points identified as a particular butt line, station, and/or water line position.

The use of one-piece, continuous keel beam and roof beam structures 202a, 202b, 203a, 203b simplifies tooling for manufacture because the keel and roof beams can double as location features for roof, floor, and fuselage subassemblies on a single, flat plane. This allows for manufacturing cost savings through tool and time reduction.

Keel beams 202a and 202b and roof beams 203a and 203b may be machined from a plate of stock material, such as aluminum. In one embodiment, each keel beam and roof beam pair 202a/203a and 202b/203b are created as a single unit by machining an aluminum plate using a CNC machine or similar tool. Alternatively, each keel beam 202a, 202b and roof beam 203a, 203b may be machined separately, and then each pair 202a/203a and 202b/203b can be attached using a fixed attachment point or slip joint. In other embodiments, roof beams 203a and 203b may be created as an extruded bar instead of machining the components from plate stock, while the keel beams are machined separately.

Prior keel beam designs required the joining of two or more subcomponents to create the angled design 202a, 202b as shown in FIGS. 2 and 3. Typically, such prior designs required reinforcing plates at bend region 301 to connect shorter subcomponents, which added weight to the design, created a potential failure point, and made it more difficult to keep the keel beam aligned. Embodiments disclosed herein provide a single, continuous keel beam that does not require additional reinforcement to connect portions 302 and 303. Additionally, single, continuous structure reduces the complexity and weight of the aircraft electrical system by creating an easily accessible aircraft equipotential plane for common grounding of electrical equipment.

In one embodiment, the keel beams 202a and 202b and roof beams 203a and 203b have a hollow, C-shaped cross-section as shown in FIG. 4. Keel beam 202b is machined to create a web section 401 between an upper flange 403 and a lower flange 402. Similarly, roof beam 203b is machined to create a web section 405 between an upper flange 406 and a lower flange 407. The parameters (e.g., thickness and length) of web sections 401, 405 and flanges 402, 403, 407, and 406 may be determined based upon the structural requirements of the aircraft and the properties of the source material.

Keel beams 202a and 202b and roof beams 203a and 203b may have a plurality of holes or openings 210 formed in web 401 and 405. The region near holes 210 may be reinforced, such as by forming a thicker portion 407 of web 401 on keel beam 202b and/or thicker portion 408 of web 405 on roof beam 203b.

Figure 5:
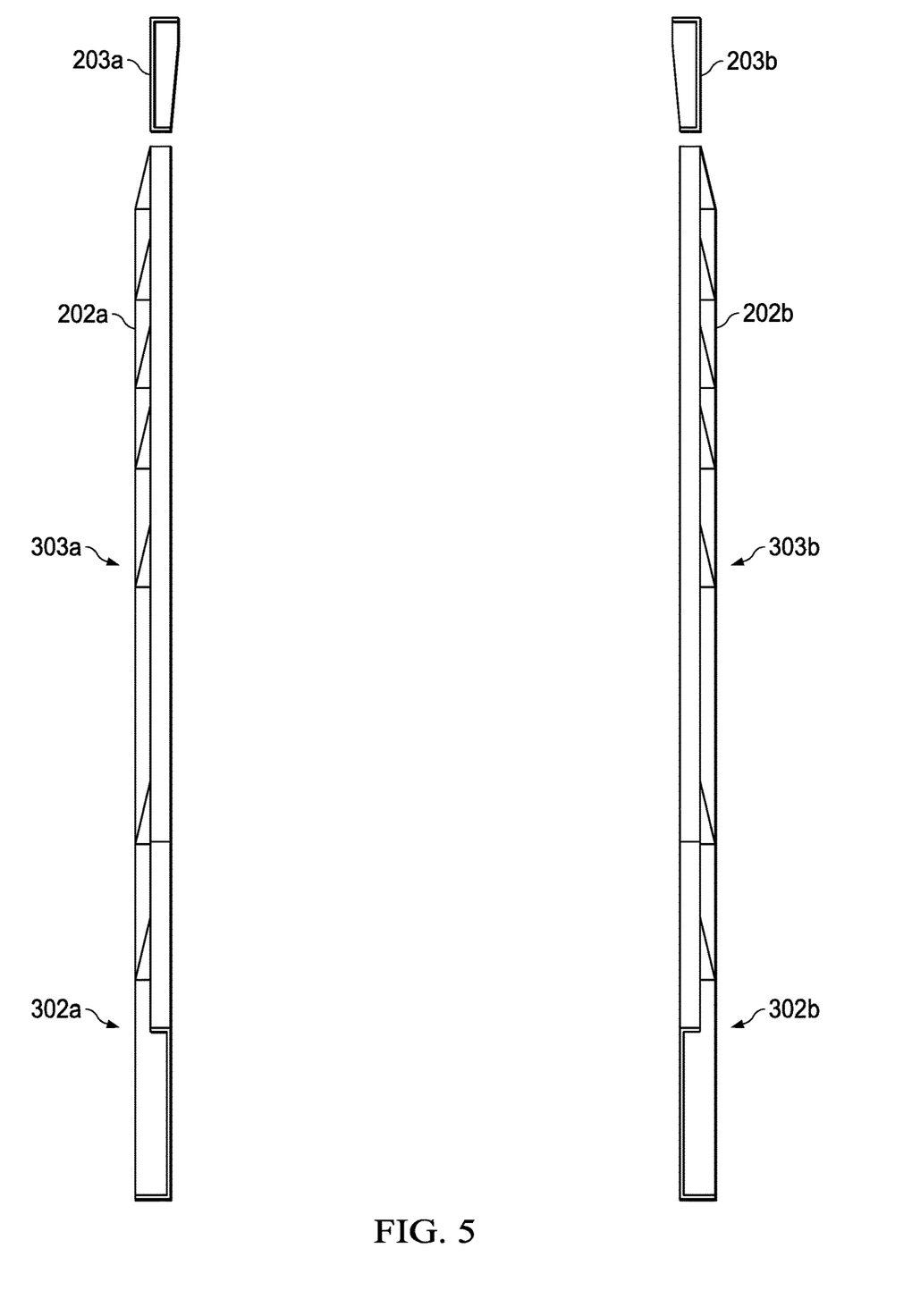
FIG. 5 is a view of the keel beams and roof beams as shown looking aft in FIG. 3.

FIG. 5 is a view of keel beams 202a and 202b and roof beams 203a and 203b as shown looking aft in FIG. 3. As shown in FIG. 5, in one embodiment, keel beam 202a and roof beam 203a are coplanar, which means that portions 302a and 303a are also coplanar with roof beam 203a. Keel beam 202b and roof beam 203b are also coplanar, which means that portions 302b and 303b are also coplanar with roof beam 203a. Accordingly, each keel/roof beam pair 202a/203a and 202b/203b are on a single butt line. The planes formed by each keel/roof beam pair 202a/203a and 202b/203b are parallel in the illustrated embodiment.

In the embodiment illustrated in FIGS. 4 and 5, web 401 is on the inboard side of keel beam 202b and web 404 is on the outside of roof beam 203b relative to the center of fuselage assembly 201. In other embodiments, the web for the keel beams may be on the outboard side while the web for the roof beams is on the inside. In further embodiments, the web for both the keel beam and the roof beam may be on the same side (e.g., inboard or outboard) relative to the center of fuselage assembly 201. Further embodiments may have web 401 and/or web 405 positioned in the center or middle portion of the keel beam and/or roof beam. The selection of the web position may be determined based upon the structural requirements of the aircraft and the properties of the source material.

Figure 6:
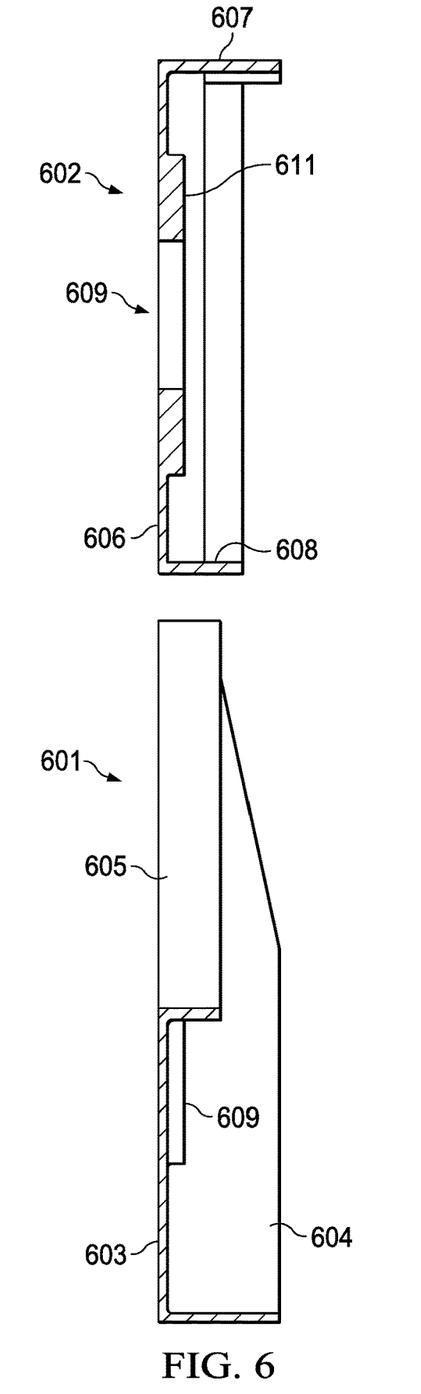
FIG. 6 is a cross-section view of a keel beam and a roof beam according to an alternative embodiment.

FIG. 6 illustrates a cross-section of a keel beam 601 and roof beam 602 having a hollow, C-shape. Keel beam 601 is machined to create a web section 603 between an upper flange 605 and a lower flange 604. Similarly, roof beam 602 is machined to create a web section 606 between an upper flange 607 and a lower flange 608. The web 603 of keel 601 and web 606 of roof beam 602 may be in same butt line to allow for simple and weight-efficient connection at the aft end of fuselage assembly 201. The parameters (e.g., thickness and length) of web sections 603 and 606 and flanges 604, 605, 607, and 608 may be determined based upon the structural requirements of the aircraft and the properties of the source material. Keel beam 601 and roof beam 602 may have a plurality of holes or openings 609 formed in web 603 and 606. The region near holes 609 may be reinforced, such as by forming a thicker portion 610 of web 603 on keel beam 601 and/or thicker portion 611 of web 606 on roof beam 602.

In an example embodiment, an aircraft fuselage comprises a keel beam having a first portion and a second portion. The first portion and the second portion are formed from a single, continuous material. The second portion is positioned at an angle to the first portion. The aircraft fuselage further comprises a roof beam coupled to the second portion of the keel beam. The roof beam is coplanar with the first and second portions of the keel beam. The first portion and the second portion of the keel beam and the roof beam may all be formed from the single, continuous material.

In an embodiment, the second portion of the keel beam is fixedly coupled to the roof beam so that the roof beam does not move relative to the keel beam.

In an embodiment, a slip joint couples the roof beam to the keel beam. The slip joint may allow for angular alignment between the roof beam and the keel beam. The slip joint may allow for lateral and/or longitudinal alignment of the roof beam relative to the keel beam.

The aircraft fuselage may further comprise one or more additional keel beams. Each additional keel beam has a first portion and a second portion formed from a single, continuous material. The first and second portions of each additional keel beam are positioned at an angle to each other. A separate roof beam is coupled to the second portion of each additional keel beam so that respective roof beams are coplanar with the first portion and the second portion of an associated keel beam.

The keel beam may have a C-shaped cross-section comprising a first web between first upper and lower flanges. The roof beam may have a C-shaped cross-section comprising a second web between second upper and lower flanges. Each of the first and second webs may have a plurality of holes.

In another example embodiment, an aircraft fuselage comprises a first keel beam and roof beam pair and a second keel beam and roof beam pair. Each keel beam and roof beam pair is positioned on a single butt line on opposite sides of an aircraft fuselage centerline. Each keel beam comprises a single, continuous material having a first portion and a second portion. The second portion is configured at an angle to the first portion, and the roof beam is coupled to the second portion of the keel beam. The roof beams are coplanar with the first portion and the second portion of each corresponding keel beam. The first portion and the second portion of the keel beam and the roof beam may be formed from the single, continuous material. A plurality of frames may be coupled to the roof beams and either the first portions or the second portions of corresponding keel beams.

In an embodiment, the second portion of the keel beam is fixedly coupled to the roof beam so that the roof beam does not move relative to the keel beam.

In an embodiment, a slip joint couples the roof beam to the keel beam in each keel beam and roof beam pair. The slip joint may allow for angular alignment between the roof beam and the keel beam. The slip joint may allow for lateral and/or longitudinal alignment of the roof beam relative to the keel beam.

In a further embodiment, an aircraft fuselage comprises two keel beams and two roof beams. Each keel beam formed as a single component having no joints. Each keel beam comprising a first portion that is configured to define a floor of an aircraft and a second portion that is configured to define a tail section of an aircraft. The second portion is positioned at an angle relative to the first portion. Each roof beam is coupled to the second portion of a corresponding keel beam at a point remote from the first portion. Each roof beam and a corresponding keel beam are positioned along a single butt line relative to an aircraft fuselage centerline. The keel beam and a corresponding roof beam are formed as a single component from a single, continuous material. A plurality of frame members are coupled to both keel beams and both roof beams.

Each keel beam and each roof beam comprise a web portion between an upper flange and a lower flange. The web portion comprises a plurality of reinforced openings. The web portion of each keel beam may be located on an opposite side or a same side relative to location of the web portion of a corresponding roof beam.

Although the example illustrated herein depicts a fuselage with two pairs of keel/roof beam structures, it will be understood that in other embodiments more than two pairs of keel/roof beam structures may be used in a fuselage design and construction. Alternatively, a single, continuous keel/roof beam structure may be used in a fuselage design, which may be supplemented by additional separate keel beams and roof beams.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. An aircraft fuselage, comprising:
    at least two keel beams each having a first portion and a second portion, the first portion and the second portion formed from a single, continuous material, the second portion positioned at an angle to the first portion; and
    at least two roof beams each coupled to the respective second portion of the keel beam, wherein the roof beam is coplanar with the first and second portions of the keel beam, wherein the at least two roof beams are parallel with one another and disposed proximate upper corners of the fuselage, and wherein the keel beams and the roof beams extend to one or more tail wings mounted on the fuselage, and are coupled together using a slip joint that allows for angular and lateral and/or longitudinal alignment between the roof beam and the keel beam.

2. The aircraft fuselage of claim 1, wherein the first portion and the second portion of the keel beam and the roof beam are formed from a single, continuous material.

3. The aircraft fuselage of claim 1, wherein the second portion of the keel beam is fixedly coupled to the roof beam so that the roof beam does not move relative to the keel beam.

4. The aircraft fuselage of claim 1, further comprising:
    the keel beam having a C-shaped cross-section comprising a first web between first upper and lower flanges; the roof beam having a C-shaped cross-section comprising a second web between second upper and lower flanges; and each of the first and second webs having a plurality of holes.

5. An aircraft fuselage, comprising:
    a first keel beam and roof beam pair; and
    a second keel beam and roof beam pair,
    wherein each keel beam and roof beam pair is positioned on a single butt line on opposite corners of an aircraft fuselage, each keel beam comprises a single, continuous material having a first portion and a second portion, wherein the second portion is configured at an angle to the first portion, wherein the roof beam is coupled to the second portion of the keel beam, wherein the roof beams are coplanar with the first portion and the second portion of each corresponding keel beam, wherein the at least two roof beams are parallel with one another, and wherein the keel beams and the roof beams extend to one or more tail wings mounted on the fuselage, and are coupled together using a slip joint that allows for angular and lateral and/or longitudinal alignment between the roof beam and the keel beam.

6. The aircraft fuselage of claim 5, wherein the first portion and the second portion of the keel beam and the roof beam are formed from the single, continuous material.

7. The aircraft fuselage of claim 5, wherein the second portion of the keel beam is fixedly coupled to the roof beam so that the roof beam does not move relative to the keel beam.

8. The aircraft fuselage of claim 5, further comprising:
a plurality of frames coupled to the roof beams and either the first portions or the second portions of corresponding keel beams.

9. An aircraft fuselage, comprising:
two keel beams, each keel beam formed as a single component having no joints, each keel beam comprising a first portion that is configured to define a floor of an aircraft and a second portion that is configured to define a tail section of an aircraft, wherein the second portion is positioned at an angle relative to the first portion;
two roof beams, each roof beam coupled to the second portion of a corresponding keel beam at a point remote from the first portion, wherein each roof beam and a corresponding keel beam are positioned along a single butt line relative to an aircraft fuselage centerline; and
a plurality of frame members, each frame member coupled to both keel beams and both roof beams, wherein the roof beams are coplanar with the first portion and the second portion of each corresponding keel beam, wherein the at least two roof beams are parallel with one another and disposed proximate upper corners of the fuselage, and wherein the keel beams and the roof beams extend to one or more tail wings mounted on the fuselage, and are coupled together using a slip joint that allows for angular and lateral and/or longitudinal alignment between the roof beam and the keel beam.

10. The aircraft fuselage of claim 9, wherein each keel beam and each roof beam comprise a web portion between an upper flange and a lower flange, and wherein the web portion comprises a plurality of reinforced openings.

11. The aircraft fuselage of claim 10, wherein the web portion of each keel beam is located on an opposite side relative to location of the web portion of a corresponding roof beam.

12. The aircraft fuselage of claim 9, wherein the keel beam and a corresponding roof beam are formed as a single component from a single, continuous material.

* * * * *